United States Patent Office 3,702,320
Patented Nov. 7, 1972

3,702,320
METHOD FOR PREPARING URETHANES FROM CYCLIC NITRILE CARBONATES AND A HYDROXYL-CONTAINING COMPOUND
William H. Fritok, Glenolden, Pa., Larry G. Wolgemuth, Cherry Hill, N.J., and Robert C. Strand, New City, N.Y., assignors to Atlantic Richfield Company, New York, N.Y.
No Drawing. Filed May 12, 1970, Ser. No. 36,697
Int. Cl. C08g 22/04
U.S. Cl. 260—77.5 B         28 Claims

ABSTRACT OF THE DISCLOSURE

Urethanes are prepared by condensing-rearranging a hydroxyl group-containing compound with a cyclic nitrile carbonate in the presence of a catalytically-effective amount of dissolved tin, titanium, zinc, bismuth, aluminum or iron compound in which the metal is in a valence state other than zero. Using, for instance, propanol and ethane nitrile carbonate as illustrative reactants, the urethane-forming condensation-rearrangement reaction can be represented as follows:

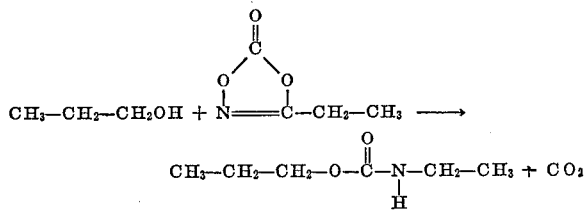

It is disclosed in U.S. Pat. 3,531,425 that this condensation reaction can be catalyzed by a basic material such as a tertiary amine having a p.k.a. value greater than 8, e.g., triethylamine. In a later-filed application of the same inventors, Ser. No. 780,878, filed Dec. 3, 1968, it is disclosed that the reaction can be catalyzed with a combination of (1) a first metal selected from the metals of Groups III through V of The Periodic Chart and (2) a second metal selected from the metals of Groups I and II and the iron series of Group VIII of The Periodic Chart.

It has now been discovered that six of the metals disclosed in Ser. No. 780,878 as being suitable for use in the multi-metal catalyst of that application can be used effectively even when not in combination with other metals, provided that reaction temperatures in the range of about 120–150° C. are used. These metals are tin, titanium, zinc, bismuth, aluminum, and iron. In accordance with the present invention, then, the urethane-forming condensation reaction is catalyzed by contacting the reactants with a catalytically-effective amount of a compound of aluminum, tin, titanium, zinc, bismuth, or iron dissolved in the reaction mixture. Unlike the process disclosed in said Ser. No. 780,878, when, in the present process, the metal compound is a compound of aluminum, tin, titanium or bismuth the reaction is run in the substantial absence of metals of Groups I, II, and the iron series of Group VIII of The Periodic Chart of the Elements. Also, when the metal compound which is used in the present invention is a compound of zinc or iron, then the reaction is run in the substantial absence of metals of Groups III through V of The Periodic Chart.

The cyclic nitrile carbonate used in the process of the present invention will often have the structure:

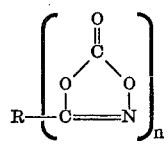

wherein R is an organic radical which consists essentially of carbon and hydrogen and is free of reactive hydrogens as determined by the Zerewitinoff test, and n is 1 to 4. A compound which contains a reactive hydrogen as determined by the Zerewitinoff test is one which, when contacted with a Grignard solution of methyl iodide, will effect the liberation of methane by decomposition of the Grignard reagent. By "consisting essentially of carbon and hydrogen" is meant that the essential composition of the radical is carbon and hydrogen but that there can be included therein other elements as well, so long as they do not materially affect the radical's basic characteristic of being non-interferring in the condensation reaction of the cyclic nitrile carbonate group with the hydroxyl group. Examples of non-interferring groups which can be present in R and which contain elements other than carbon and hydrogen are alkoxy, nitro, and halo groups. The R radical can be aromatic, e.g. of 1 to 3 aromatic rings (fused or non-fused) or non-aromatic and, when the latter, can be cyclic or acyclic and saturated or ethylenically or acetylenically unsaturated. Groups which decompose easily when slightly heated or agitated as, for example, vinylacetylenic groups, are preferably not present in R. Acyclic R's can be straight or branched chain. The cyclic nitrile carbonate group can be attached to an aromatic ring carbon atom, or to a cycloaliphatic ring carbon atom, or to a non-ring carbon atom. When R is aromatic it is preferred that no two cyclic nitrile carbonate groups occupy ortho positions with respect to one another. The molecular weight of the cyclic nitrile carbonate will often be below about 75,000.

The cyclic nitrile carbonate used in the process of the present invention can be prepared by phosgenating the corresponding hydroxamic acid, preferably while the latter is in solution in a stable solvent. The hydroxamic acid, in turn, can be prepared by various methods known in the art, such as, for example, by reacting the methyl ester of the corresponding carboxylic acid with hydroxylamine. Examples of suitable cyclic nitrile carbonates include, for instance, cyclohexane nitrile carbonate; ethane nitrile carbonate; propane-2-nitrile carbonate; ethene nitrile carbonate; cyclohexene-3-nitrile carbonate; benzene nitrile carbonate; 2,2-diphenylpropane-4,4'-di(nitrile carbonate); 4-vinylbenzene-1-nitrile carbonate; 1-vinylanthracene-3,9-di(nitrile carbonate); butane-1,4-di(nitrile carbonate); hexane-1,6-di(nitrile carbonate); benzene-1,4-di(nitrile carbonate); naphthalene-1,4-di(nitrile carbonate); etc.

The cyclic nitrile caronate used in the process of the present invention can also be derived from other cyclic nitrile carbonates. Thus, for example, an addition-polymerizable, ethylenically-unsaturated, cyclic nitrile carbonate, such as ethene nitrile carbonate, can be addition polymerized with a dissimilar monomer, such as styrene or acrylonitrile, to yield a polymeric cyclic nitrile carbonate which is suitable for use in the process of the present invention. Also, a polyfunctional cyclic nitrile carbonate, such as hexane-1,6-di(nitrile carbonate) can be condensed-rearranged in stoichiometrically excessive amounts with a hydroxyl group-containing compound as used in the present process to yield a urethane group-containing cyclic nitrile carbonate which is suitable for use in the process of the present invention. The latter condensation-rearrangement can be catalyzed by any suitable system—for example, using a strong base or combination metal catalyst of the prior art, or by using the catalyst of this invention. Also, suitable cyclic nitrile carbonates for use as reactants in the present process can be obtained by condensing-rearranging stoichiometrically excessive amounts of a polyfunctional cyclic nitrile carbonate with a compound having one or more primary amino, secondary amino, or mercapto groups—for example, as disclosed in the aforementioned U.S. Pat. 3,531,425 and application Ser. No. 780,878. The resultant condensation-rearrangement products contain urea or thiourethane groups, in addition to the unreacted, excess cyclic nitrile carbonate groups.

The hydroxyl group-containing compound used in the process of the present invention can be any of the hydroxy compounds which will react with isocyanates to yield urethanes. These include the very simplest monohydric alcohols, such as ethanol, 1-propanol, 1-butanol, 1-hydroxybutenes, 1-pentanol, 1-hydroxypentenes, 1-hexanol, 1-heptanol, 1-decanol, phenol, naphthols, xylenols, hydroxytoluenes, polyhydric polyethers, polyhydric polyesters, etc., as well as the more complicated monohydric and polyhydric compounds, e.g. the hydroxyl group-containing polymeric compounds such as hydroxyl group-containing polyesters and polyesters. Also suitable are already-formed urethanes prepared with an excess of polyfunctional hydroxy compound and, therefore, containing unreacted hydroxyl groups. The molecular weight of the hydroxyl group-containing compound will often be below about 75,000.

The process of the present invention is particularly useful when preparing a polyurethane by condensing-rearranging a polyol with a polyfunctional cyclic nitrile carbonate, for example a diol with a di(nitrile carbonate). Suitable polyols include, for example, ethylene glycol, diethylene glycol, propylene glycol, 1,3-butanediol, 1,6-hexanediol, dihydroxybutanes, dihydroxybutynes, dihydroxypentanes, 2-methyl-2,4-pentanediol, 1,7-heptanediol, glycerine, neopentyl glycol, trimethylolpropane, pentaerythritol, di(hydroxymethyl)cyclohexanes, sorbitol, mannitol, galactitol, talitol, xylitol, 1,2,5,6-tetrahydroxyhexane, vinylphenylethylene glycols, bis($\beta$ - hydroxyethylphenyl) propanes, 1,4-dihydroxybenzene, polycarprolactone glycols, etc. Especially suitable diols are the poly(alkylene ether)glycols—for example, those having molecular weights of about 200 to 3000 preferably about 650 to 3000, and wherein the alkylene radicals contain 2 to 6, preferably 2 to 4, carbon atoms. Especially suitable di (nitrile carbonates) are those wherein R is hydrocarbon and contains about 2 to 20, preferably about 2 to 14, carbon atoms. Where R in the latter compounds is acyclic it is often preferred that the two nitrile carbonate groups be separated by the longest chain in R.

The metal compound used as the catalyst in the process of the present invention is one which is sufficiently soluble in the reaction mixture, preferably in the hydroxyl group-containing reactant, to provide catalytically-effective amounts of the compound in solution in the reaction zone. The metal may be in any valence state except zero. Generally, it will be suitable to employ an amount of the metal compound sufficient to provide at least about 10 parts, preferably about 100–3000 parts, of the metal, calculated as the free metal, per each million parts by weight of the hydroxyl group-containing compound. Compounds of suitable solubility include oxides, hydroxides, halides (preferably chlorides), alcoholates, chelates, and craboxylic acid salts of the various metals. Suitable alcoholates include, for example, the alkoxides, aryloxides, aralkoxides, and alkaryloxides of the metals. Suitable chelates include, for example, those formed from beta-dikentones, e.g., the acetylacetonates. Suitable carboxylic acid salts include, for example, the fatty acid salts such as the laurates. Solubility in the reaction mixture of certain suitable metal compounds can be enhanced by including an inert solvent therefor, such as para-dioxane or tetrahydrofuran, and these can be included in amounts up to, say, about 50 weight percent or more of the total reaction mixture.

The relative proportions of hydroxyl group-containing compound and cyclic nitrile carbonate that are employed in the process of the present invention can vary widely and their choice is largely dictated by the type of product desired. Generally, an excess of either reactant can be used. Where both reactants are polyfunctional e.g., difunctional, and it is desired to prepare a polyurethane therefrom, then the reactants should be used in proportion which provide a ratio of cyclic nitrile carbonate groups to hydroxyl groups of about 0.7 to 10:1; to obtain relatively high molecular weight polyurethanes a ratio of approximately 1 should be used. Where, however, it is desired instead to prepare a hydroxyl group-containing, urethane prepolymer, then it is necessary to employ a stoichiometric excess of the polyol, e.g. a diol. Usually, a ratio of hydroxyl group to nitrile carbonate group of about 1.5 to 10:1, preferably about 2 to 4:1 is used to prepare such prepolymers. The reverse applies when it is desired to prepare a cyclic nitrile carbonate group-containing, urethane prepolymer. Thus, it is seen that the same considerations pertain here when selecting reactant ratios as when selecting the relative proportions of a hydroxyl group-containing compound and an isocyanate to be used in preparing a urethane.

The reaction temperature for the process of the present invention is in the range of about 120–150° C. Reaction times will vary and, where polyurethanes are prepared, will be dependent to some extent on the molecular weight desired for the product. Usually the reaction will be complete in up to about 12 hours, often in about 1 to 5 hours. Subatmospheric, atmospheric and superatmospheric pressures can be used.

The process of the present invention is capable of providing polyurethanes having exceptionally high molecular weights, for example of 400,000 (weight average molecular weight) and higher, as well as polyurethanes having much lower molecular weights, for instance of 90,000 and lower. It may often be desired to employ the process to prepare polyurethanes having molecular weights of at least about 200,000 or even at least about 300,000.

In a preferred method of preparing polyurethanes by the process of the present invention, the polyol reactant is degassed prior to being admixed with either the catalyst or the poly(nitrile carbonate). The purpose of the degassing is to remove water and molecular oxygen from the system. Water might serve to react with and dilute the effect of some of the catalysts which can be used in the present process; also, it can react with the cyclic nitrile carbonate reactant under certain conditions. Certain hydroxyl group-containing compounds, e.g., the poly(tetramethylene ether) glycol used in Example I herein, are sensitive to molecular oxygen at the present reaction temperatures. Thus the reason for preferring, under appropriate circumstances, to purge moisture and oxygen from the hydroxyl group-containing reactant. The degassing can often be accomplished by subjecting the polyol to a temperature of about 60 to 150° C. at about 0.25 to 50 mm. Hg pressure for from 15 to 60 minutes. After the addition of the catalyst, further degassing—say, for up to about 4 hours—under the same conditions may be conducted. After addition of catalyst and such further degassing, a substantially oxygen-free atmosphere, for example, a nitrogen or other inert gas atmosphere, is advantageously created and maintained in the reaction vessel, during which time the desired poly(nitrile carbonate) is added, preferably in small portions over periods of, say, about three minutes to two hours. During the addition of the carbonate the reaction mixture can be stirred and the temperature advantageously maintained between about 120 and 130° C. Following complete addition of the carbonate the temperature of the reaction mixture is maintained in the range of about 120–150° C. for, say, about fifteen minutes to about 12 hours, the time being dependent on other variables employed in carrying out the polymerization. The reaction mixture is advantageously stirred during the reaction. It is often advantageous to add a solvent for the urethane product, such as xylene, to the reaction mixture gradually, as the mixture thickens, to keep the mixture at a stirrable viscosity. This is especially so where the product is a polyurethane. The amount of solvent added will preferably not exceed the total weight of the reactants. Preferred solvents for this purpose are aromatic solvents which are liquid at room temperature, have boiling points of at least about 130° C., and contain no ether, ester or nitro groups. Examples of such include, in addition to the xylenes, such as butyl-, chloro-, and bromoamylbenzene, bromobenzene, chlorobenzene, substituted toluenes, etc.

It is possible in accordance with the present invention to produce either cellular or nonporous plastics, including films, coatings, adhesive layers, impregnated compositions, castings, moldings and the like. However, in the production of polyurethane foams by the process of the invention it is not necessary to employ an extraneous foaming or blowing agent since the cyclic nitrile carbonate reactants contain their own internal or "built in" blowing agent, namely the carbon dioxide gas that they evolve during reaction with the hydroxyl group-containing compounds. Conventional foaming agents, however, may be employed if desired; among those which are suitable may be listed: low boiling solvents such as benzene, toluene, acetone, ethyl ether, butyl acetate, methylene dichloride, carbon tetrachloride and the like, as well as agents which will decompose to evolve an inert gas as, for instance, ammonium carbonate, sodium bicarbonate, N,N'-dimethyl-N,N' - dinitrosoterephthalamide, para,para'-oxybis(benzenesulfonic acid), azodicarbonamide, benzene sulfonyl hydrazide, azodiisobutyronitrile, para-tertiary butyl benzoylazide and the like.

Formulation of polyurethane foams can follow the well established practice of the art, except that the conditions of the reaction between the cyclic nitrile carbonate compound and polyol should be controlled to effect the reaction at a rate slow enough to preclude escape of the evolved $CO_2$ gas before there has been gelation of the reaction mixture to the extent sufficient to entrap the evolved gas and form a cellular, elastomeric polyurethane. Ordinarily, the desired reaction speed can be acquired by selection of a suitable catalyst concentration, usually below about 0.1% by weight of the reactants. Catalyst concentrations much above this level tend to liberate the gas prior to the establishment of sufficient gelation to cause entrapment.

When preparing foamed polyurethanes by the method of the present invention it is generally preferred to employ at least a trifunctional reactant, which can be either the cyclic nitrile carbonate, the hydroxyl group-containing compound, or both. Thus, for example, excellent polyurethane foams can be prepared by condensing-rearranging a difunctional cyclic nitrile carbonate with a triol to yield a cross-linked product.

If desired, surface active agents may be used, for instance in concentrations of about 1 to 5% by weight of the reactants, to stabilize the foam. Generally useful are silicone emulsifiers and non-ionic surface active agents such as condensates of ethylene oxide with vegetable oils, alcohols, or organic acids.

In accordance with the usual practice, inert, inorganic or organic fillers, or both, and other additives may be included in the reaction mixture. Suitable inert, inorganic materials include, for example, clay, talc, silica, carbon black, asbestos, glass, mica, calcium carbonate, antimony oxide and the like. Organic fillers include, for instance, the various polymers, copolymers and terpolymers of vinyl chloride, vinyl acetate, acrylonitrile, acrylamide, styrene, ethylene, propylene, butadiene, divinylbenzenes, etc. Other additives which may be added include plasticizers such as dioctyl phthalate and di(2-ethylhexyl) adipate, extenders, softeners, coloring agents and emulsifiers.

Urethane products having many and varied uses can be prepared by the process of the present invention, as, for example, in the preparation of castings, molds, sealants, potting compounds, insectides, adhesives, coatings, films, etc.

The invention will be better understood by reference to the following examples.

EXAMPLE I

To a 100 ml. resin kettle equipped with a mechanical stirrer was added 20 g. (0.02 mol.) of a poly(tetramethylene ether)glycol having a molecular weight of 980 and a hydroxyl number of 114. This glycol was then degassed for one hour at 15 mm. Hg. pressure at 115° C. The catalyst (30 mg. of aluminum isopropoxide, i.e. 180 p.p.m. Al based on the weight of the glycol) was then added and the system was degassed again for 45 minutes under the conditions described above. Maintaining the temperature at 115° C., the evacuated reaction kettle was opened to a nitrogen atmosphere and continuously purged with nitrogen while 4.65 g. (0.02 mol.) of butane 1,4-di(nitride carbonate) was added. Heating of the reaction mixture at 133° C. was continued for 12 hours to yield a non-sticky, rubbery polyurethane having a weight average molecular weight (Mw.) of 110,000, as determined by gel permeation chromatography (GPC). The polyurethane was soluble in tetrahydrofuran, acetone, ethylacetate, chloroform and xylene and its infrared spectrum showed bands at 2.95 microns (indicative of N-H stretching) and at 5.87 microns (indicative of

(stretching) which bands are characteristic of polyurethanes.

EXAMPLE II

This preparation of a polyurethane was identical to Example I except that 10 g. (0.01 mol.) of the poly(tetramethylene ether)glycol, 30 mg. of the aluminum isopropoxide (390 p.p.m. of Al based on the weight of the glycol) and 2.32 g. (0.01 mol.) of the butane-1,4-di(nitrile carbonate) were used. In addition, during the polymerization the reaction temperature was maintained at 150° C. The polyurethane obtained had a Mw. of 160,000 as determined by GPC. Its solubility and infrared spectrum were identical to the polymer obtained in Example I.

EXAMPLE III

To a 100 ml. resin kettle equipped with a mechanical stirrer was added 10 g. (0.01 mole) of the same poly (tetramethylene ether)glycol as was used in Example 1. This glycol was then degassed for one hour at 15 mm. Hg. pressure at 115° C. The temperature of the glycol was then raised to 135° C. and the evacuated reaction kettle was opened to a nitrogen atmosphere and continuously purged during tthe remainder of the reaction. Dibutyltin dibutoxide (40 mg., i.e., 1,250 p.p.m. based on the weight of the glycol) was added. Three minutes after adding the catalyst, 2325 g. (0.01 mol.) of butane-1,4-di(nitrile carbonate) was added in six minutes. Gel time for the reaction mixture was three hours. After the reaction mixture had gelled, it was heated an additional 4 hours at 135° C. The polymer obtained was a non-sticky, rubbery material which was light yellow in color. This polyurethane has a Mw. of 316,000, as determined by GPC. Its solubility and infrared spectrum were identical to the polymer obtained in Example I.

EXAMPLE IV

The preparation described in Example III was repeated at a reaction temperature of 150° C. instead of 135° C. Gel time for the reaction mixture was 75 minutes. Total reaction time was 4 hours. The polyurethane obtained had a Mw. of 183,000, as determined by GPC.

EXAMPLE V

The preparation described in Example IV was repeated with the exception that xylene (40 wt. percent based on total weight of the reaction mixture) was added 30 minutes after the butane-1,4-di(nitrile carbonate) had been added. A water cooled condenser was also fitted to the reaction kettle to contain the xylene in the reaction vessel. Total reaction time was 3 hours and 40 minutes, including the time required to strip off the xylene. The polyurethane obtained had a Mw. of 200,000, as determined by GPC.

EXAMPLE VI

The preparation described in Example V was repeated with the exception that the reaction system was degassed for 5 minutes after the addition of the dibutyltin dibutoxide. Total reaction time was 4 hours. The polyurethane obtained had a Mw. of 412,000, as determined by GPC.

EXAMPLE VII

The experiment described in Example VI was scaled up 4.5 times and repeated. The polyurethane obtained had a Mw. of 252,800, as determined by GPC. Its solubility and infrared spectrum were identical to the polyurethane obtained in Example I.

EXAMPLE VIII

To a 100 ml. resin kettle equipped with a mechanical stirrer and a water cooled reflux condenser was added 15 g. (0.0075 mol) of a poly(tetramethylene ether)glycol having a molecular weight of 2010 and a hydroxyl number of 56. This glycol was then degassed for one hour at 15 mm. Hg pressure at 115° C. The temperature of the reaction was then raised to 150° C. and the evacuated reaction kettle was opened to a nitrogen atmosphere and continuously purged with nitrogen during the remainder of the reaction. To this glycol was added 80 mg. (1,800 p.p.m. tin based on the weight of the glycol) of bis(tributyltin oxide). This was allowed to react with the glycol for 20 minutes, then 1.63 g. (0.00715 mol) of butane-1,4-di(nitrile carbonate) was added in 6 minutes. Gel time for the reaction mixture was 15 minutes. To decrease the viscosity of the gel, m-xylene (16 g.) was added thereto and the mixture was continuously heated at 150° C. for an additional 3 hours and 45 minutes. The resulting polyurethane was colorless and had a Mw. of 253,000, as determined by GPC.

EXAMPLE IX

The preparation in Example VIII was repeated except that dibutyltin dibutoxide (50 mg. i.e. 1,050 p.p.m. tin based on the weight of the glycol) was used in place of the bis(tributyltin oxide). The tin catalyst was allowed to react with the glycol for 30 minutes, then the reaction mixture was degassed for five minutes prior to the addition of the butane-1,4-di(nitrile carbonate). Gel time for the reaction mixture was 35 minutes. Total reaction time was 4 hours. The resulting polyurethane was light yellow in color and had a Mw. of 254,000, as determined by GPC.

EXAMPLE X

The preparation described in Example IV was repeated using tetrabutyltitanate (695 p.p.m. of titanium based on the weight of the glycol) instead of dibutyltin dibutoxide as the catalyst. The gel time for the reaction mixture was two hours. Total reaction time was six hours. The resulting polyurethane was light yellow in color and was a non-sticky, rubbery mass.

EXAMPLE XI

The preparation described in Example IV was repeated using zinc acetylacetonate (750 p.p.m. of zinc based on the weight of the glycol) instead of dibutyltin dibutoxide as the catalyst. Total reaction time was two hours. The resulting polyurethane was water-white in color.

EXAMPLE XII

The preparation described in Example IV was repeated using bismuth chloride (2000 p.p.m. of bismuth based on the weight of the glycol) instead of dibutyltin dibutoxide at the catalyst. Total reaction time was 2 hours and 30 minutes. The resulting polyurethane was carmel in color. The infrared spectrum of this polymer showed bands characteristic of urethane linkages and no bands which are characteristic of the starting nitrile carbonate.

EXAMPLE XIII

The preparation described in Example VIII was repeated using iron(III) acetylacetonate (50 mg., i.e. 530 p.p.m. iron based on the weight of the glycol) instead of bis-(tributyltin oxide) as the catalyst. This iron catalyst turned the reaction mixture dark red. The total reaction time was 4½ hours. The resulting polyurethane was a sticky wax-like material. Its infrared spectrum showed bands characteristic of urethane linkages.

EXAMPLE XIV

The preparation described in Example V was repeated using dibutyltin dilaurate (50 mg., i.e. 933 p.p.m. tin based on the weight of the glycol) instead of dibutyltin dibutoxide as the catalyst. Also, the reaction mixture temperature was maintained at 145° C. instead of 150° C. Total reaction time was five hours. The resulting polyurethane was light yellow in color and had a Mw. of 115,700, as determined by GPC.

EXAMPLE XV

The preparation described in Example V was repeated using dibutyltin oxide (25 mg., i.e. 1,200 p.p.m. tin based on the weight of the glycol) instead of dibutyltin dibutoxide as the catalyst. The catalyst was allowed to react two hours with the glycol prior to addition of the butane-1,4-di(nitrile carbonate). The resulting polyurethane had a Mw. of 88,000, as determined by GPC.

It is claimed:
1. A method of preparing a urethane, comprising condensing-rearranging a hydroxyl group-containing compound with a cyclic nitrile carbonate by contacting the reactants at about 120–150° C. with a catalytically-effective amount of a compound of aluminum, tin, titanium, zinc, bismuth, or iron which is soluble in the reaction mixture, provided that the metal is in a valence state other than zero, further provided that when the metal compound is a compound of aluminum, tin, titanium, or bismuth that said contacting be in the substantial absence of metals of Groups I, II, and the iron series of Group VIII of The Periodic Chart of the Elements, and further provided that when the metal compound is a compound of zinc or iron that said contacting be in the substantial absence of metals of Groups III through V of the Periodic Chart of the Elements.

2. The method of claim 1 wherein the cyclic nitrile carbonate has the structure:

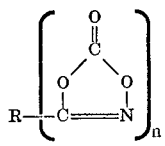

wherein R is an organic radical which consists essentially of carbon and hydrogen and is free of reactive hydrogens, as determined by the Zerewitinoff test, and $n$ is 1 to 4.

3. The method of claim 2 wherein the hydroxyl group-containing compound is a polyol.

4. The method of claim 3 wherein $n$ in the structure of the cyclic nitrile carbonate is 2 to 4.

5. The method of claim 4 wherein the metal compound is soluble in the hydroxyl group-containing compound and the amount of the metal compound employed is sufficient to provide at least about 10 parts of the metal, calculated as the free metal, per each million parts by weight of the hydroxyl group-containing compound.

6. The method of claim 5 wherein the hydroxyl group-containing compound is a poly(alkylene ether) glycol.

7. The method of claim 6 wherein $n$ is the structure of the cyclic nitrile carbonate is 2.

8. The method of claim 7 wherein R in the structure of the cyclic nitrile carbonate is a hydrocarbon radical.

9. The method of claim 8 wherein R is a saturated non-aromatic radical.

10. The method of claim 9 wherein R is acyclic.

11. The method of claim 10 wherein the metal compound is a compound of aluminum.

12. The method of claim 11 wherein the metal compound is aluminum isopropoxide, the cyclic nitrile carbonate compound is butane-1,4-di(nitrile carbonate), and the hydroxyl group-containing compound is poly(tetramethylene ether) glycol having a molecular weight of about 650 to 3000.

13. The method of claim 12 wherein the amount of the metal compound employed is sufficient to provide about 100 to 3000 parts of the metal, caluulated as the free metal, per each million parts by weight of the hydroxy-group-containing compound.

14. The method of claim 10 wherein the metal compound is a compound of tin.

15. The method of claim 14 wherein the metal compound is selected from the group consisting of dibutyltindibutoxide, bis(tributyltinoxide-, dibutyltindilaurate, and dibutyltinoxide, the cyclic nitrile carbonate compound is butane-1,4-di(nitrile carbonate), and the hydroxyl group-containing compound is poly(tetramethylene ether)glycol having a molecular weight of about 650 to 3000.

16. The method of claim 15 wherein the amount of the metal compound employed is sufficient to provide about 100 to 300 parts of the metal, calculated as the free metal, per each million parts by weight of the hydroxyl group-containing compound.

17. The method of claim 10 wherein the metal compound is a compound of titanium.

18. The method of claim 17 wherein the metal compound is tetrabutyltitanate, the cyclic nitrile carbonate compound is butane-,4-di(nitrile carbonate), and the hydroxyl group-containing compound is poly(tetramethylene ether) glycol having a molecular weight of about 650 to 3000.

19. The method of claim 18 wherein the amount of the metal compound employed is sufficient to provide about 100 to 3000 parts of the metal, calculated as the free metal, per each million parts by weight of the hydroxyl group-containing compound.

20. The method of claim 10 wherein the metal compound is a compound of zinc.

21. The method of claim 20 wherein the metal compound is zinc acetylacetonate, the cyclic nitrile carbonate compound is butane-1,4-di(nitrile carbonate), and the hydroxyl group-containing compound is poly(tetramethylene ether)glycol having a molecular weight of about 650 to 3000.

22. The method of claim 21 wherein the amount of the metal compound employed is sufficient to provide about 100 to 3000 parts of the metal, calculated as the free metal, per each million parts by weight of the hydroxyl group-containing compound.

23. The method of claim 10 wherein the metal compound is a compound of bismuth.

24. The method of claim 23 wherein the metal compound is bismuth chloride, the cyclic nitrile carbonate compound is butane-1,4-di(nitrile carbonate), and the hydroxyl group-containing compound is poly(tetramethylene ether) glycol having a molecular weight of about 650 to 3000.

25. The method of claim 24 wherein the amount of the metal compound employed is sufficient to provide about 100 to 3000 parts of the metal, calculated as the free metal, per each million parts by weight of the hydroxyl group-containing compound.

26. The method of claim 10 wherein the metal compound is a compound of iron.

27. The method of claim 26 wherein the metal compound is iron(III) acetylacetonate, the cyclic nitric carbonate compound is butane-1,4-di(nitrile carbonate), and the hydroxyl group-containing compound is poly(tetramethylene ether) glycol having a molecular weight of about 650 to 3000.

28. The method of claim 27 wherein the amount of the metal compound employed is sufficient to provide about 100 to 3000 parts of the metal, calculated as the free metal, per each million parts by weight of the hydroxyl group-containing compound.

References Cited

UNITED STATES PATENTS 3,531,425   9/1970   Burk et al.

DONALD E. CZAJA, Primary Examiner

M. J. WELSH, Assistant Examiner

U.S. Cl. X.R.

260—37 N, 37.8 N, 482 B, 482 C, 859 R, 859 PV